April 24, 1945.   F. S. STERNAD ET AL   2,374,391
APPARATUS FOR BUILDING TIRES
Filed Dec. 9, 1941
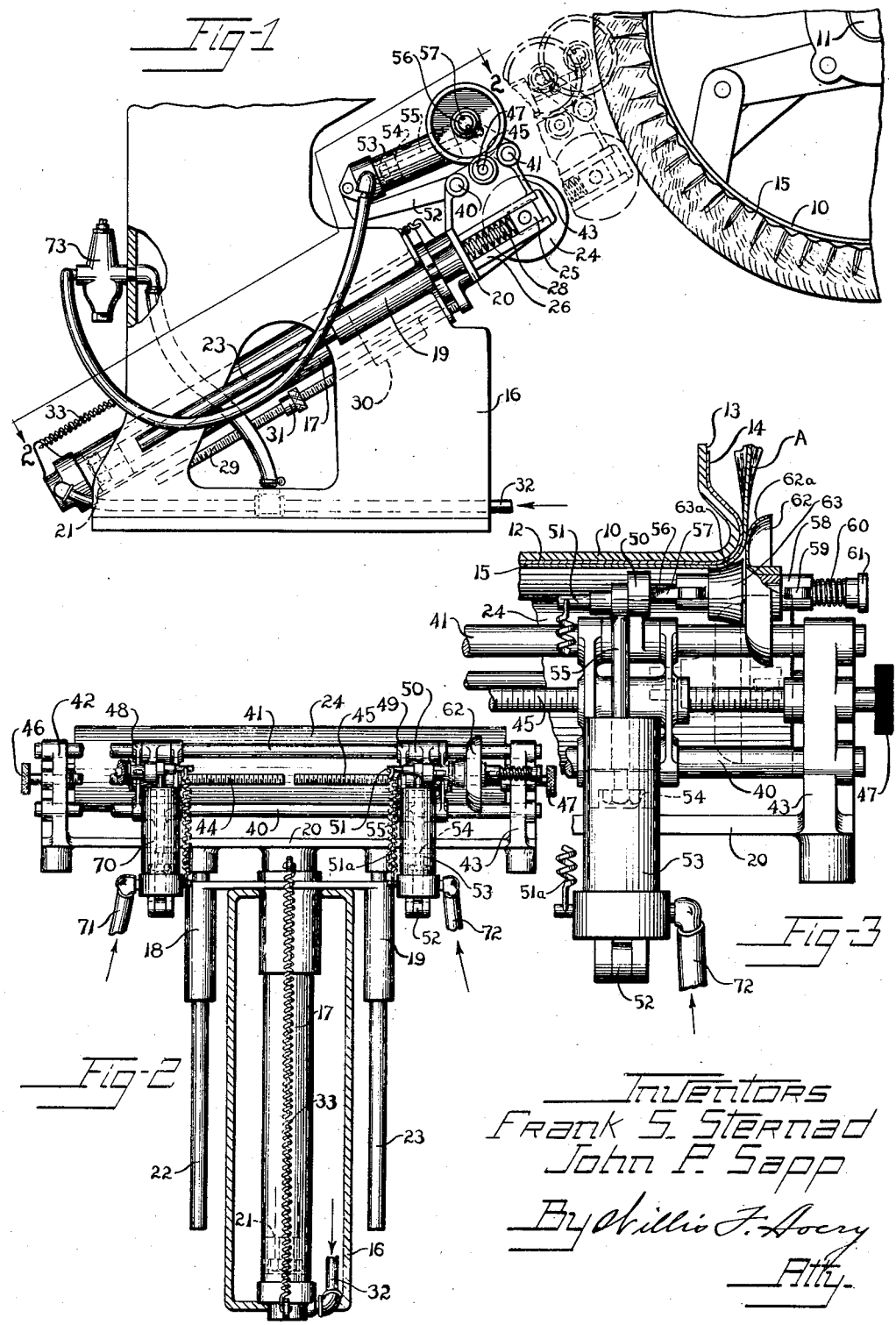

Patented Apr. 24, 1945

2,374,391

UNITED STATES PATENT OFFICE 2,374,391

APPARATUS FOR BUILDING TIRES

Frank S. Sternad, Cuyahoga Falls, and John P. Sapp, Kent, Ohio, assignors to The B. F. Goodrich Company, New York, N. Y., a corporation of New York Application December 9, 1941, Serial No. 422,242

5 Claims. (Cl. 154—10)

This invention relates to apparatus for building tires and is especially useful in building tires of textile material and rubber-like material.

In the manufacture of pneumatic tires by the drum-building process it has been found desirable, especially where the tires are of large cross-section, to employ building forms or drums having radial or undercut side forming faces so that the bead reinforcements may be incorporated in substantially the same position they will assume in the finished tire. Such drums or formers have a broad cylindrical surface between the side forming surfaces about which endless bands of crossed plies of rubberized bias laid cords are first applied and rolled in place with their margins extending therebeyond at each side. The overhanging margins of the band are later stitched to conform to the under-cut side forming faces of the drum. However, before the stitching operation is commenced, it has been found necessary to break or fold the margins inwardly along the side forming faces and this has been done by slowly rotating the drum while the operator progressively folded the material in steps by hand. This operation has been laborious and time-consuming and it has been difficult to obtain uniformly high quality results.

Objects of the invention are to provide mechanism for facilitating the operation and to obtain uniformly high quality results.

Further objects are to provide simultaneous folding of the band margins about the side forming faces of the drum, and to provide simultaneous rolling of the material on the cylindrical face of the drum.

These and other objects will appear from the following description and the accompanying drawing.

Of the drawing:

Fig. 1 is a side elevation of a portion of a tire building drum with sheet material partially applied thereto and apparatus embodying and constructed in accordance with the invention for forming the sheet material about the shoulders of the drum, the apparatus being shown in its retracted position by full lines and in its farthest advanced working position in dot and dash lines, parts being broken away.

Fig. 2 is a sectional view taken on line 2—2 of Fig. 1, parts being broken away.

Fig. 3 is an enlarged view of one end of the apparatus as shown in Fig. 2, parts being shown in section and parts being broken away.

In the illustrative embodiment of the invention, a broad faced roller is advanced in contact with the material on the cylindrical face of the rotating drum, a pair of discs having rounded shoulders and resiliently pressed toward each other are then brought in contact with the material at the shoulders of the drum and fed both axially and radially of the drum over its shoulders while curved faced rollers engage the material over the rounded shoulders and the material is turned toward the drum axis progressively around the drum.

Referring to the drawing, the numeral 10 designates a tire building former or drum mounted for rotation on the spindle 11 of a tire building machine. The drum has a cylindrical face 12 and undercut side forming faces such as 13 at each side thereof. As shown in Fig. 3 a band 14 of rubberized cord material has been shaped over the surfaces of the drum and a second band 15 is being applied thereto.

For supporting the forming mechanism, a stationary frame 16 is mounted near the drum 10 and supports a single acting pressure-fluid-operated cylinder 17 and a pair of guides 18, 19 extending radially of the drum. A movable crosshead 20 is fixed to a piston 21 fitted in cylinder 17 and has a pair of guide rods 22, 23 adapted to be slidably guided in guides 18, 19. A free running roller 24 having a cushion face of resilient rubber-like material wider than the drum 10, is rotatably mounted in bearings, such as 25, which are slidably fitted in guideways, such as 26, formed on the crosshead 20. Compression coil springs, such as 28, resiliently hold the roll bearings in an advanced position. A threaded rod 29 fixed to the crosshead 20 and extending through a clearance opening in a lug 30 formed on the cylinder, has a threaded nut 31 thereon for limiting movement of the crosshead toward the drum. Fluid pressure may be supplied to cylinder 17 or exhausted therefrom through a pipe 32 from a three-way valve (not shown). The arrangement is such that when air or other fluid is supplied to pipe 32 from a suitable source of fluid pressure by way of the valve, the roller 24 is moved radially of the drum into engagement with the material thereon, and when the valve is manipulated to exhaust cylinder 17 the roller is returned to the full-line position of Fig. 1 by a tension coil spring 33 one end of which is attached to the cylinder 17 and the other end to the crosshead 20.

For progressively folding and smoothing the material about the shoulders of the drum, a pair of rods 40, 41 have their ends fixed to the crosshead 20 and extend in parallelism, parallel to the roll 24, brackets 42, 43 being formed on the crosshead to retain them. Threaded shafts 44, 45 are rotatably journaled in brackets 42, 43 respectively parallel to the rods in alignment with each other and are retained therein against end movement. Knobs 46, 47 are fixed to the shafts to permit manual rotation thereof. A carriage 48 is slidably mounted on rods 40, 41 and has threaded engagement with the shaft 44. A similar carriage 49 is slidably mounted on rods 40, 41 and has threaded engagement with shaft 45. The rod engaging portions of these carriages are bifurcated so as to confine lever arms therebetween. A lever arm 50 is rotatably and slidably mounted on rod 41 between bifurcations of carriage 49 and has a pin 51 extending laterally therefrom. A link 52 is rotatably and slidably mounted on rod 40 between bifurcations of carriage 49 and has a single-acting pressure-fluid-operated cylinder 53 pivotally attached to its swinging end. A piston 54 fitted in the cylinder has a connecting rod 55 connected thereto which engages pin 51. The arrangement is such that when fluid under pressure is admitted to cylinder 53 arm 50 is rocked forward about rod 41 toward the drum. An extension coil spring 51a has one end attached to pin 51 and the other end to cylinder 53 and acts to return the arm when cylinder 53 is exhausted.

Arm 50 has a shaft 56 fixed thereto and extending parallel to the axis of the drum. This shaft has opposite keyways 57. A quill 58 is slidably mounted on the shaft, being guided by rollers 59 carried thereby and engaging the keyways. A compression coil spring 60 encircles the shaft 56 between the quill 58 and a collar 61 fixed to the shaft. The arrangement is such that the quill normally rests against arm 50 but may be moved along shaft 56 compressing spring 60. A dished forming disc 62 having a rounded shoulder face 62a is rotatably mounted on quill 58 and restrained thereby against axial movement relative thereto. A smaller forming roller 63 is rotatably mounted on the quill adjacent the closed side of disc 62 and is also restrained by the quill against end movement relative thereto. Roller 63 has a concave face 63a adapted to conform to the curvature of material over the shoulder of drum 10. The arrangement is such that with carriage 49 adjusted along rods 40, 41 to a position where the shoulder 62a is opposite a shoulder of drum 10, forward movement of arm 50 under fluid pressure of cylinder 53 will cause disc 62 to contact with material over the drum shoulder and the disc will be forced to the right in Figs. 2 and 3 progressively rolling the material over the drum shoulder against pressure of spring 60 until the disc can move radially past the drum shoulder, whereupon the disc will fold the material progressively to a radially inwardly extending position, as indicated at "A" in Fig. 3. Then the roller 63 contacts the material over the shoulder of the drum, smoothing it in place.

Carriage 48 is equipped with similar elements to those carried by carriage 49 except that the parts are left-handed for simultaneous operation on the other shoulder of the drum. Cylinder 70 on carriage 48 has a flexible hose connection 71 and cylinder 53 on carriage 49 has a flexible hose connection 72. Both hose connections are supplied by fluid pressure from pipe 32 through a normally spring closed Logan Air Cycle valve 73 providing delayed action of cylinders 53, 70.

The operation of the apparatus is as follows:

The knobs 46, 47 are adjusted to bring the rounded shoulders of the discs 62 opposite the shoulders of the drum 10. A band of rubberized cords is applied over the cylindrical face of the drum with its margins extending over the shoulders of the drum. Fluid under pressure is then admitted to pipe 32, whereupon roller 24 is advanced against the surface of the drum. As the roller stops moving forward, the fluid pressure in pipe 32 increases and opens valve 73 advancing discs 62 against the material on the drum. The curved face 62a of each disc engages the curved margin of the drum and cooperates therewith to roll the material thereabout while the disc is progressively forced axially of its shaft by the camming action of the shoulder until the disc can pass the side of the drum folding the material progressively to the position indicated at "A" in Fig. 3. The roller 63 then contacts the material over the shoulder, smoothing it to the desired curvature. When the air pressure in pipe 32 is shut off the cycle valve 73 permits free flow of fluid from cylinders 53, 70, as it has a built in check valve permitting free flow away from these cylinders. The discs 62 and rollers 63 and roller 24 all return to the full line position of Fig. 1.

The invention provides for simultaneous progressive folding of both margins of the band ply over the shoulders of the drum uniformly and smoothly.

Variations may be made without departing from the scope of the invention as it is defined by the following claims.

We claim:

1. Apparatus for turning a margin of a band of sheet material about a shoulder of a rotatable form having a substantially cylindrical face and a side forming face, said apparatus comprising a roller adapted to engage material on the cylindrical face of the form, means for advancing the roller radially of the form into engagement with material on its surface, a forming disc rotatably mounted to align with a shoulder of the form and having a sloping shoulder for engaging the material on the shoulder of said form, means for resiliently holding the disc axially in such alignment, and means responsive to advance of said roller into engagement with the material on the form for moving the disc against the material on the form shoulder and a portion of the disc radially therebeyond after the engagement by said roller to fold the material progressively about the shoulder after the engagement by said roller.

2. Apparatus for turning a margin of a band of sheet material about a shoulder of a rotatable form having a substantially cylindrical face and a side forming face, said apparatus comprising a resilient roller adapted to engage material on the cylindrical face of the form, means for advancing the roller radially of the form into engagement with material on its surface, a forming disc rotatably mounted to align with a shoulder of the form and having a sloping shoulder for engaging the material on the shoulder of said form, means for resiliently holding the disc axially in such alignment, and means for moving the disc against the material on the form shoulder and a portion of the disc radially therebeyond after the engagement by said roller to fold the material progressively about the shoulder while the material is pressed by said roller against the cylindrical face of the form.

3. Apparatus for turning a margin of a band of sheet material about a shoulder of a rotatable form having a substantially cylindrical face and a side-forming face, said apparatus comprising a carriage mounted for movement radially of the form, a roller rotatably mounted on said carriage and adapted to engage the material over the cylindrical face of the form, a forming disc supported by said carriage and mounted to align with a shoulder of the form, said forming disc having a sloping shoulder for engaging the material on the shoulder of said form, means for resiliently holding the disc axially of the form in such alignment, means for advancing said carriage and the roller radially of the form to engage the material on its cylindrical face and to advance the disc toward the form, and means for further advancing said disc after the engagement by said roller to advance the disc against the material on the shoulder and a portion of the disc radially beyond the shoulder to fold the material progressively about the shoulder while the material is pressed by said roller against the cylindrical face thereof.

4. Apparatus for turning a margin of a band of sheet material about a shoulder of a rotatable form having a substantially cylindrical face and a side-forming face, said apparatus comprising a carriage mounted for movement radially of the form, a roller rotatably mounted on said carriage and adapted to engage the material over the cylindrical face of the form, a forming disc supported by said carriage and mounted to align with a shoulder of the form, said forming disc having a sloping shoulder for engaging the shoulder of said form, means for resiliently holding the disc axially of the form in such alignment, means for advancing said carriage and the roller radially of the form to engage the material on its cylindrical surface and to advance the disc toward the form, and means responsive to advance of said roller into engagement with material on the form for thereafter advancing the disc with respect to said roller and a portion of the disc radially beyond the shoulder of the form to fold the material progressively about the shoulder while the material is pressed by said roller against the cylindrical face thereof.

5. Apparatus for turning a margin of a band of sheet material about a shoulder of a rotatable form having a substantially cylindrical face and side-forming face, said apparatus comprising a carriage slidably mounted for movement radially of the form, a resilient roller rotatably mounted on said carriage and adapted to engage the material on the cylindrical face of the form, a forming disc supported by said carriage and mounted to align with a shoulder of the form, said forming disc having a sloping shoulder for engaging the material on the shoulder of said form, means for resiliently holding the disc axially of the form in such alignment, a rotatable forming element associated with said disc and having a concave face for smoothing the material about said shoulder, means for advancing the carriage and roller radially of the form to engage the material on its cylindrical surface and to advance the disc and the forming element toward the form, and means responsive to advance of said roller into engagement with the material on the form for advancing said disc and forming element relative to said carriage into engagement with the material on the shoulder and to advance a portion of said disc radially beyond the shoulder to fold the material progressively about the shoulder and to engage said forming element with the folded material at the shoulder while the material is pressed by said roller against the cylindrical face thereof.

FRANK S. STERNAD.
JOHN P. SAPP.